Nov. 7, 1950   J. W. HOOD   2,529,295
PURIFICATION TREATMENT
Filed Jan. 5, 1949   2 Sheets—Sheet 2

INVENTOR
John W. Hood
BY
Frank A. Bower
ATTORNEY

Patented Nov. 7, 1950

2,529,295

UNITED STATES PATENT OFFICE 2,529,295

PURIFICATION TREATMENT

John W. Hood, Ridgewood, N. J.

Application January 5, 1949, Serial No. 69,379

4 Claims. (Cl. 210—7)

This invention relates to the clarification of aqueous solutions such as sewage and various waste liquors.

The object is to bring the various aqueous solutions met with in practice into condition for biological oxidation by means such as so-called biological "filtration" and resulting purification and to attain an effluent from the biological oxidation means substantially divested of colloidal and other suspensions and having a low biochemical oxygen demand and high stability.

The treatment of the solution comprises the creation of conditions favorable to the nitrifying as well as the carbonaceous bacteria by preaeration and controlled inoculation of the solution with nitrifying bacteria and clarification by sedimentation over sufficient time for the culture of the said bacteria and for general aerobic development.

The aeration introduces oxygen to the raw material at a point in the primary clarifier, the introduction being by means of a mechanical device or system such as a submerged diffused air installation, or vacuum tuyère equipment suspended above the liquid surface, or any other aeration device.

The introduction of inoculum containing nitrifying bacteria to the aerated liquid subjected is preferably by means of a recirculation of a relatively small part of the effluent from the biological oxidation means, the present treatment creating conditions in this effluent favorable to this inoculation and requiring normally a recirculation of only about a quarter of the raw material inflow.

An adequate contact period for the culture of the nitrifying bacteria and general aerobic development (including aerobic types symbiotically related to nitrifying bacteria) is provided mainly in the flow through the initial clarifying stage during which the heavier solid matter is settled out as sediment, or in the subsequent culture tank.

In the accompanying drawings illustrating the invention

Figure 1:
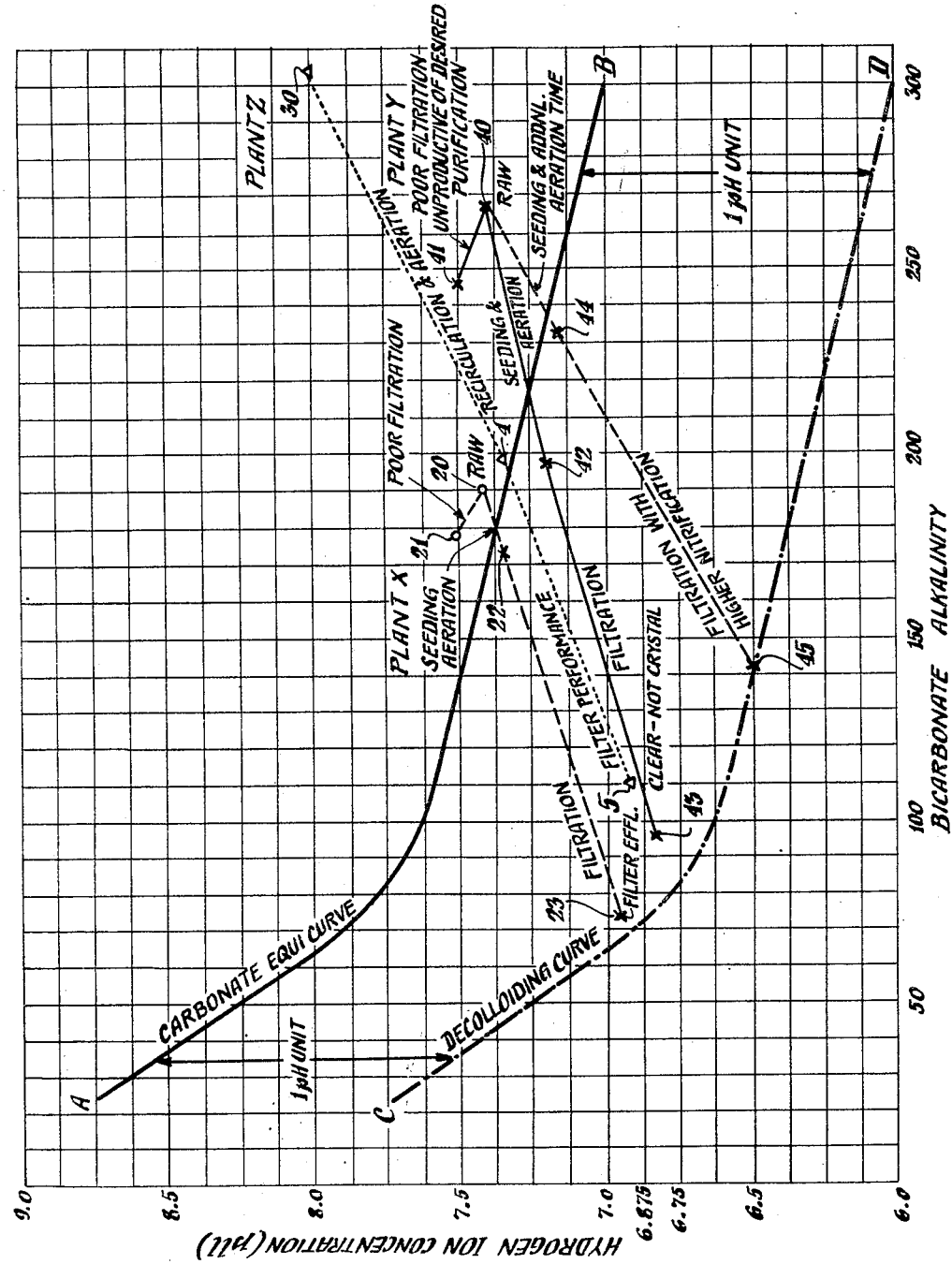
Fig. 1 is a curve sheet showing the conditions for most effective purification by the present system.

I have found that the solution, such as sewage and various waste liquors, prior to its entry into the biological oxidation means, should for best results be brought to a critical alkalinity and pH which is not substantially above the carbonate equilibrium curve A—B shown in Fig. 1. This curve shows the pH value at which calcium carbonate can exist in equilibrium in an aqueous solution and the term "carbonate equilibrium curve" as used herein and in the claims is employed in this sense. With the solution entering the biological oxidation means at point 4 above the carbonate equilibrium curve the preconditioning of the solution should be such that the oxidation action 4—5 will modify the pH and alkalinity to bring these to a point 5 below the curve A—B and toward the "decolloiding" curve designated C—D on the drawing about one pH below the curve A—B. It is only under these conditions that an efficient decolloiding can take place.

Whenever the raw influent to be treated changes to bring about a departure from these preconditions, the pretreatment itself must be modified to restore the proper culturing with oxygen and nitrifying bacteria to insure that the effluent from the biological oxidation means is at a point on or above the decolloiding curve C—D.

With this recirculation providing inoculum and with the simultaneous aeration of the culture for an adequate contact period, the sewage entering the biological oxidation means is brought to a pH and alkalinity sufficiently close to the carbonate equilibrium curve A—B so that the subsequent action in said means will carry the pH and alkalinity into proximity with or even below the decolloiding curve C—D. Results short of crystal clarity may be obtained slightly above the decolloiding curve C—D.

Figure 2:
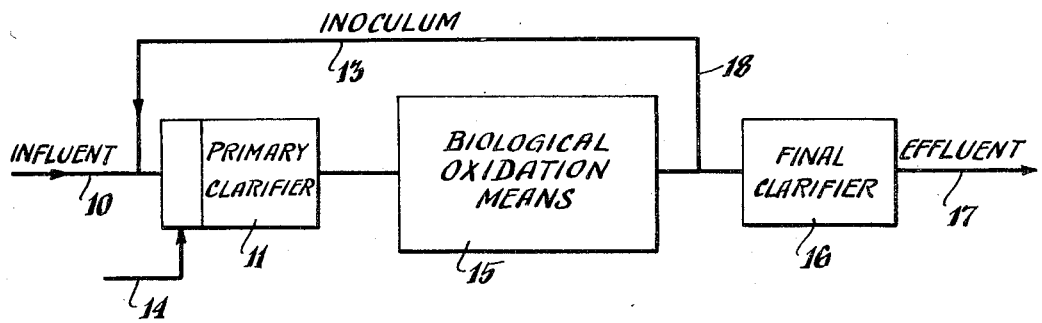
Fig. 2 is a diagram showing a typical system of sewage treatment.

In the system illustrated in Fig. 2, the influent sewage at 10 enters the primary clarifier 11 removing the heavier sediment and receives a continuous seeding of inoculum through conduit 13 from a point following the biological oxidation means 15, and at the same time the air for aeration is diffused in from supply line 14. After being detained for a sufficient contact and culture period in tank 11, the preconditioned sewage is passed on to the biological oxidation means 15. This may be, for instance, a trickling "filter" distributing the flow over stone or sand media coated naturally with a zoogloeal film for the oxidizing and purifying action. From this the purified effluent is passed on to the final clarifier 16 from which the final effluent is discharged at 17. The supply of inoculum for the conduit 13 may be drawn either from the outflow of the biological oxidation means at 18 as shown in Fig. 2, or from the final effluent at 19 as shown in Fig. 3, or from the final clarifier as indicated at 25 in Fig. 4.

Figure 3:
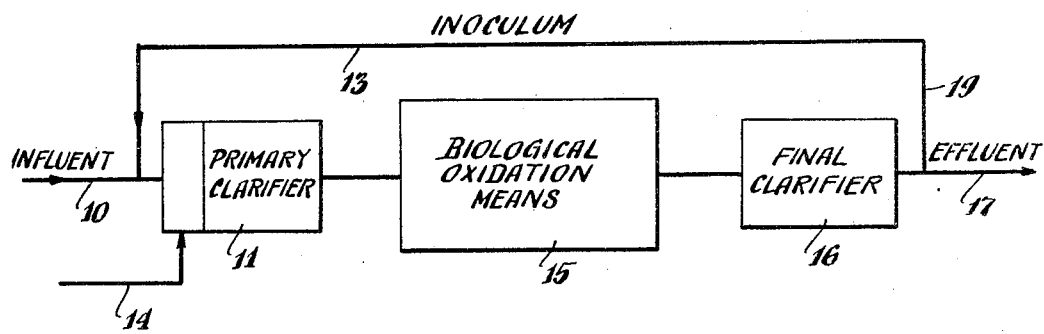
Figs. 3 and 4 are diagrams of systems similar to that shown in Fig. 2 but somewhat modified.
Figure 4:
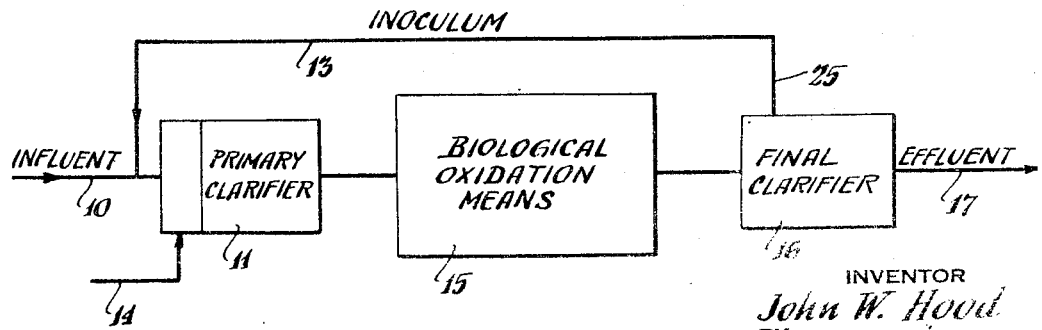

In these installations the inoculum and air supplies 13, 14 are delivered to the clarifier sewage preferably at the entrance to the clarifier 11, as shown in Figs. 2, 3 and 4, so as to allow an adequate contact period for the preconditioning in advance of the biological oxidation step.

To aid in this preconditioning the aqueous solution at entrance may be supplied with a predetermined amount of effluent from the biological oxidation means in quantity sufficient to reduce the pH and alkalinity to within reach of effective filter action.

When this preconditioning has thus developed the culture of nitrifying bacteria and adjusted the pH alkalinity equilibrium to such a level that the action of this preliminary treatment has brought the mixture to or below the carbonate equilibrium curve and the biological oxidation means then carries the solution to a point near the decolloiding curve C—D, this biological filter action is efficient to give effective decolloiding, because in the zoogloeal film on the filter surfaces the nitrifying bacteria are preserved through the whole or a larger part of the filter bed and these bacteria have favorable conditions for their growth.

Nitrifying bacteria are numerically weak in ordinary sewages, only 100 per milliliter being typical. An additional supply of these bacteria for raw sewage inoculum purposes is therefore essential and an adequate oxygen supply is a basic requirement of the environment of these bacteria. The inoculum and the air or oxygen supply together with the proper preconditioning as to pH and alkalinity are therefore necessary to the effective action of the biological oxidation means, together with the thorough mixing and maturing of these preconditions bringing the nitrifying bacteria into thorough association with the material in solution.

Two distinct processes occur in a biological oxidation means such as a trickling filter— namely (1) the removal of carbonaceous compounds by the oxidizing aerobic bacteria and (2) the conversion of ammonia and ammonia compounds by nitrifying bacteria, the carbonaceous removal normally taking precedence over nitrification. Overloading of the biological oxidation means I have found to be at the expense of the nitrifying bacteria, the level of their action in the bed of the said means receding downward and eventually moving out altogether as the bed is progressively overloaded. In such case the biological oxidation means functions substantially as a carbonaceous removing agency, the work done being represented on Fig. 1 of the drawings as an increase upward from 20 to 21 rather than downward. The effluent in such circumstances cannot be satisfactorily decolloided in the biological oxidation means without further preconditioning.

Considering the raw sewage represented by the point 20 of plant X, instead of raising the pH and failing to desirably precondition the effluent as indicated by the line 20, 21, the system of this invention during the treatment before biological filtration aerates and cultures the material and at the same time reduces the pH for instance as shown by the line 20, 22 (Fig. 1).

Therefore, starting with the raw sewage equilibrium at a peak strength of pH 7.4 and alkalinity 190 P. P. M. M. O. and assuming existing plant of predetermined filter capacity, the raw inflow is admixed with a quantity of filter effluent either in the primary clarifier 11 or the aeration-detention tank, of approximately 20% by volume. This serves the double purpose of inoculating raw material with active bacteria agents from the filter and also gives a slight downward equilibrium adjustment 20, 22 as shown in Fig. 1. From the time that the recycled material is introduced to the raw subject, dissolved oxygen should be maintained to a minimum concentration of 2 P. P. M. all the way to the point where the culture mixture reaches and is applied to the filter or other biological oxidation means. Under this active encouragement of the culture I have found the filter adjustment downwards in terms of pH and alkalinity about in the neighborhood of 0.4 pH and 100 P. P. M. alkalinity, so that beginning from a point 22 slightly below the carbonate equilibrium curve A—B, the filter effluent reaches a point 23 near to the decolloiding curve C—D, or approximately 1 pH below the curve A—B.

This adjustment as above accomplished by the proper culturing of the raw material as to inoculum, aeration and time, followed by the biological oxidation under the favorable conditions established by the preconditioning and very complete removals of organic and mineral content are at the same time attained. The aesthetic value of the subject, when expressed in P. P. M. turbidity, is greatly enhanced, the turbidity approaching zero and being clear or even crystal-clear sufficiently close to the decolloiding curve C—D.

Considering a plant Z, with a raw subject of equilibrium and organic strength corresponding to the point 30 (Fig. 1), the application of this to a filter or biological oxidation means under these conditions of bicarbonate alkalinity and hydrogen ion concentration will result in little or no purification regardless of the dosing technique which leaves the subject at or near the point 30. I have found that such material in accordance with the filter performance as above explained must be brought to a lower point of equilibrium in the neighborhood of the equilibrium curve and at the same time must be seeded and cultured by inoculation and aeration so as to be in a condition favorable for the preservation and propagation of the culture on the zoogloeal film by the biological oxidation means. The raw subject at the point 30 is therefore subjected to increased recirculation of the effluent through conduit 13 and intensified and protracted aeration, bringing the equilibrium before filtration down to the point 4. The recirculation ratio is about one to one and the dissolved oxygen is maintained slightly above 2 P. P. M. resulting in a readjustment by virtue of this recirculation and dilution to bring the point of equilibrium of the filter influent slightly above the carbonate equilibrium curve A—B. The biological oxidation means then will automatically carry the equilibrium down further to the point 5 where the effluent is very clear and quite acceptable, but not to sparkling clarity such as would be attained at a point on or very close to the decolloiding curve.

The amount of recirculation is related to the conditions of inoculation and culture, the longer the culture period the less the required recirculation. For instance, in the performance exemplified by plant Z at points 30, 4 and 5, the detention period allowable was only in the neighborhood of ten minutes and this necessitated a large recirculation in the neighborhood of a one to one ratio, which recirculation in turn was responsible in part for the relatively short detention period. A longer culturing period, for instance of one hour, would with greatly decreased circulation depress the equilibrium even more effectively, and produce improved clarity in the effluent from the biological oxidation means. In such improvement of the culture conditions by increase in the culture time, the entire performance would swing more to the vertical, bringing the filter effluent well below the desired point of equilibrium and producing results of superlative quality.

To demonstrate the effect of the pretreatments, the plant Y may be referred to with its raw subject initially conditioned as indicated at the point 40 from which with the usual recirculation and improper preconditioning the biological oxidation treatment as by filtration would be unproductive of any substantial purification proceeding usually along the lines 40 to 41. Taking this same subject and assuming a given installation where the time of seeding and aeration is limited, the inoculation and maintenance of oxidizing conditions will depress the equilibrium along the line 40 to 42 to the point 42 prior to the biological oxidation which then will carry the material along the line 42 to 43 to the point 43 near to the decolloiding curve C with the effluent clear but not of crystal clarity. In such a system increase in the culture period, preceding the biological oxidation, might result either from a lower rate of raw influent or an increase in the size of a clarifying and culturing equipment with a corresponding improvement in the preconditioning of the nitrifying bacteria and a depression of the equilibrium along the line 40 to 44 to the point 44 prior to the biological oxidation. With this longer aeration and culture period, a better conditioning of the nitrifying bacteria is attained and the biological oxidation will continue along the lines 44 to 45 at a relatively higher rate of nitrification, bringing the point 45 substantially on the decolloiding curve C—D to give a crystal clarity in the effluent of the biological oxidation step.

The system of this invention therefore comprises the creation of an environment favorable to both the aerobic carbonaceous bacteria and the nitrifying bacteria by the introduction of oxygen to the raw subject and the introduction of inoculum containing nitrifying bacteria and mixing of the inoculum in said subject so as to insure complete dispersion and with this the downward adjustment of the carbonate equilibrium by returning additional amounts of final filtrate to the raw subject if and as required so as to insure that said subject shall be in a zone of carbonate equilibrium at the filter influent favorable to complete subsequent biochemical oxidation action or filtration.

I have found that where the filter design, as in prevailing practice, is based on B. O. D. loadings per unit volume of filter media the operation is unsatisfactory. There is no constant relation between the B. O. D. and the carbonate equilibrium so that the former is not to be depended upon as the basis of the treatment required to condition the subject for biological oxidation to produce the desired degree of treatment.

Under the system of this invention the conditions are favorable to the oxidation of ammonia and the oxidation of carbonaceous compounds is always necessarily present and complete decolloiding occurs in the biological oxidation means following the preconditioning. This decolloiding also necessarily reduces the B. O. D. because the treatment has substantially divested the subject of colloidal and other suspensions by consumption of the putrifying bacteria and other unstable matter by the aerobic bacteria.

The system of this invention therefore surely and efficiently attains the desired complete purification. The preconditioning and purification may often be expeditiously carried out even under limitations of available equipment providing the raw subject can be given sufficient time, areation and recirculation before the biological oxidation means, which is usually of ample capacity for a properly preconditioned subject.

Additional economy is effected where, as is preferred, the recirculated effluent is drawn from the final clarifier 16 (Fig. 4) at a point carrying with it the solids so that there is no separate digestion of this final sedimentation. The inclusion of these solids in the recirculated liquid also contributes to the effective action of the process in preconditioning the material for the biological oxidation means 15.

The nitrifying bacteria as well as the other oxidizing organisms are continuously cultured and maintained throughout the cycle including the recirculation. The interval of transfer of the recirculated portion from the filter treatment to the admixture of air is very short, not more than fifteen minutes and generally much less, and the prompt renewal of the supply of oxygen is in sufficient amount to insure a dissolved oxygen content at all times above the minimum of two parts per million and at the area of mixture of the order of six parts per million.

At design loading (volumetric) the period in the aeration-detention tank or primary clarifier in admixture with the oxygen supply allows preferably not over one-half hour for air mixing and one or, in some cases, two to three hours or more for culture or for culture and clarification, and within this time the effect of the process brings the pH and carbonate alkalinity to or below the carbonate equilibrium curve A—B. The B. O. D. of the influent is also reduced by 50 to 80% in advance of the main biological oxidation means 15 which thus receives the inflow in ideal condition for its operation. This biological filtration, therefore, starts with the material reduced in B. O. D. by 50 to 80% and the pH and bicarbonate alkalinity are at or below the critical carbonate equilibrium curve A—B irrespective of the initial condition of the raw sewage so that the functioning of the biological filtration at 15 is in the region below the curve A—B and this automatically maintains the proper and efficient conditioning and distribution of the nitrifying bacteria and other oxidizing organisms to attain the desired clarity of the effluent in the neighborhood of the decolloiding curve C—D. This with the accompanying purification attains a final effluent completely treated in that it is substantially divested of colloidal and other suspensions and also has a low B. O. D. and high stability.

This is a continuation-in-part of my co-pending application Serial No. 514,331, filed December 15, 1943, now abandoned.

I claim:

1. A process employing trickling filter means for treating sewage and other aqueous wastes consisting in supplying an influent of said material to a primary clarification by sedimentation in advance of the trickling filter and intermixing with said influent at the beginning of said primary clarifying detention period of said material an aerating supply of oxygen containing gas and substantially simultaneously therewith a supply of treated material recirculated from a later stage of the process following continuous treatment of the material by biological oxidation maintained at a dissolved oxygen content of at least two parts per million, said aerating gas supply being introduced into the mixture at the beginning of said detention and sedimentation period in amount sufficient to maintain in and through the said period said dissolved oxygen content of at least two parts per million, continuing the detention and sedimentation of said material and introduced aerating gas and recirculated material for a predetermined contact and culture period and draining off and separating out all of the settled solids with resultant clarifying action on the mixture in the presence of said introduced aerating gas to continuously culture and maintain the nitrifying bacteria and oxidizing organisms and biologically oxidize said material at said dissolved oxygen content of at least two parts per million and correspondingly reduce the biochemical oxygen demand of the influent while settling out solids from the mixture by sedimentation, subsequently subjecting the clarified material with greatly increased surface exposure to a further supply of aerating oxygen-containing gas in a trickling filter raising the dissolved oxygen content further above said two parts per million with correspondingly increased biological oxidation and producing effluent from said trickling filter having a high stability and a low biochemical oxygen demand. drawing off a portion of said effluent from said trickling filter and passing said portion back for recirculation as said supply of treated material for mixture with said influent and aerating gas in said primary clarification by sedimentation. and continuing said treatment of the material constantly under biological oxidation in the presence of a dissolved oxygen content of at least two parts per million.

2. A process for treating sewage and other aqueous waste as set worth in claim 1 in which the material during the clarifying sedimentation period is reduced in pH and bicarbonate alkalinity to or below the corresponding alkalinity curve A—B and the effluent from the trickling filter is further reduced in pH and bicarbonate alkalinity to the desired clarity in the neighborhood of the decolloiding curve C—D.

3. A process for treating sewage and other aqueous waste as set forth in claim 1 in which the clarifying sedimentation period in advance of the trickling filter retains the material for at least one hour.

4. A process for treating sewage and other aqueous waste as set forth in claim 1 in which the supply of treated material recirculated from a subsequent stage of the process is drawn from a settled portion of the effluent from the trickling filter so as to include solids in the recirculated material and subject said solids to sedimentation during the detention period.

JOHN W. HOOD.

REFERENCES CITED

The following references are of record in the file of this patent:

UNITED STATES PATENTS

| Number | Name | Date |
|---|---|---|
| Re. 22,144 | Ward | July 21, 1942 |
| 1,904,916 | Coombs | Apr. 18, 1933 |
| 1,994,887 | Downes et al. | Mar. 19, 1935 |
| 2,089,162 | Goudey et al. | Aug. 3, 1937 |
| 2,154,132 | Mallory | Apr. 11, 1939 |
| 2,180,148 | Imhoff | Nov. 14, 1939 |
| 2,349,390 | Tolman | May 23, 1944 |
| 2,350,111 | Hood | May 30, 1944 |
| 2,364,298 | Kamp | Dec. 5, 1944 |

OTHER REFERENCES

Bulletin No. 22, 1939, issued by Division of Sanitation of New York State Department of Health, pp. 139–147, 152, and 177 cited.